(12) United States Patent
Chapuis et al.

(10) Patent No.: US 7,836,322 B2
(45) Date of Patent: Nov. 16, 2010

(54) SYSTEM FOR CONTROLLING AN ARRAY OF POINT-OF-LOAD REGULATORS AND AUXILIARY DEVICES

(75) Inventors: Alain Chapuis, Riedikon (CH); Mikhail Guz, San Mateo, CA (US)

(73) Assignee: Power-One, Inc., Camarillo, CA (US)

( * ) Notice: Subject to any disclaimer, the term of this patent is extended or adjusted under 35 U.S.C. 154(b) by 601 days.

(21) Appl. No.: 11/930,049

(22) Filed: Oct. 30, 2007

(65) Prior Publication Data

US 2008/0052551 A1    Feb. 28, 2008

Related U.S. Application Data

(63) Continuation-in-part of application No. 11/760,660, filed on Jun. 8, 2007, which is a continuation of application No. 11/354,550, filed on Feb. 14, 2006, now Pat. No. 7,266,709.

(51) Int. Cl.
*G06F 1/26* (2006.01)
(52) U.S. Cl. .................. 713/340; 713/320; 323/282
(58) Field of Classification Search ............ 713/320, 713/340; 323/282
See application file for complete search history.

(56) References Cited

U.S. PATENT DOCUMENTS

| | | | |
|---|---|---|---|
| 3,660,672 A | 5/1972 | Berger et al. | |
| 4,021,729 A | 5/1977 | Hudson | |
| 4,147,171 A | 4/1979 | Greene et al. | |
| 4,194,147 A | 3/1980 | Payne et al. | |
| 4,204,249 A | 5/1980 | Dye et al. | |
| 4,328,429 A | 5/1982 | Kublick et al. | |
| 4,335,445 A | 6/1982 | Nercessian | |
| 4,350,943 A | 9/1982 | Pritchard | |

(Continued)

FOREIGN PATENT DOCUMENTS

CN    2521825    11/2002

(Continued)

OTHER PUBLICATIONS

I2C-Bus Specification, The Version 2.1, Jan. 1, 2000; Document Order No. 9398 393 40011, pp. 1-46.

(Continued)

*Primary Examiner*—Thuan N Du
(74) *Attorney, Agent, or Firm*—O'Melveny & Myers LLP

(57) ABSTRACT

A power control system comprises at least one programmable voltage regulator, at least one non-programmable auxiliary voltage regulator, and a system controller operatively connected to the at least one programmable voltage regulator and to said at least one auxiliary voltage regulator via a common serial data bus. The at least one programmable voltage regulator is adapted to provide a corresponding output voltage having characteristics defined by received programming data and to provide monitoring data reflecting operational status of the at least one programmable voltage regulator. The at least one non-programmable auxiliary voltage regulator is adapted to provide a corresponding output voltage in response to an enable signal. The system controller is adapted to send the programming data and receive the monitoring data via the serial data bus. A data monitoring circuit is operatively coupled to the at least one auxiliary voltage regulator to receive analog measurements therefrom and communicate corresponding monitoring data to the system controller.

18 Claims, 7 Drawing Sheets

U.S. PATENT DOCUMENTS

| | | | |
|---|---|---|---|
| 4,451,773 A | 5/1984 | Papathomas et al. | |
| 4,538,073 A | 8/1985 | Freige et al. | |
| 4,538,101 A | 8/1985 | Shimpo et al. | |
| 4,607,330 A | 8/1986 | McMurray et al. | |
| 4,616,142 A | 10/1986 | Upadhyay et al. | |
| 4,622,627 A | 11/1986 | Rodriguez et al. | |
| 4,630,187 A | 12/1986 | Henze | |
| 4,654,769 A | 3/1987 | Middlebrook | |
| 4,677,566 A | 6/1987 | Whittaker et al. | |
| 4,761,725 A | 8/1988 | Henze | |
| 4,940,930 A | 7/1990 | Detweiler | |
| 4,988,942 A | 1/1991 | Ekstrand | |
| 5,004,972 A | 4/1991 | Roth | |
| 5,053,920 A | 10/1991 | Staffiere et al. | |
| 5,073,848 A | 12/1991 | Steigerwald et al. | |
| 5,079,498 A | 1/1992 | Cleasby et al. | |
| 5,117,430 A | 5/1992 | Berglund | |
| 5,168,208 A | 12/1992 | Schultz et al. | |
| 5,229,699 A | 7/1993 | Chu et al. | |
| 5,270,904 A | 12/1993 | Gulczynski | |
| 5,272,614 A | 12/1993 | Brunk et al. | |
| 5,287,055 A | 2/1994 | Cini et al. | |
| 5,325,062 A | 6/1994 | Bachand et al. | |
| 5,349,523 A | 9/1994 | Inou et al. | |
| 5,377,090 A | 12/1994 | Steigerwald | |
| 5,398,029 A | 3/1995 | Toyama et al. | |
| 5,426,425 A | 6/1995 | Conrad et al. | |
| 5,440,520 A | 8/1995 | Schutz et al. | |
| 5,481,140 A | 1/1996 | Maruyama et al. | |
| 5,489,904 A | 2/1996 | Hadidi | |
| 5,508,606 A | 4/1996 | Ryczek | |
| 5,532,577 A | 7/1996 | Doluca | |
| 5,610,826 A | 3/1997 | Whetsel | |
| 5,627,460 A | 5/1997 | Bazinet et al. | |
| 5,631,550 A | 5/1997 | Castro et al. | |
| 5,646,509 A | 7/1997 | Berglund et al. | |
| 5,675,480 A | 10/1997 | Stanford | |
| 5,684,686 A | 11/1997 | Reddy | |
| 5,727,208 A | 3/1998 | Brown | |
| 5,752,047 A | 5/1998 | Darty et al. | |
| 5,774,733 A * | 6/1998 | Nolan et al. | 713/300 |
| 5,815,018 A | 9/1998 | Soborski | |
| 5,847,950 A | 12/1998 | Bhagwat | |
| 5,870,296 A | 2/1999 | Schaffer | |
| 5,872,984 A | 2/1999 | Berglund et al. | |
| 5,874,912 A | 2/1999 | Hasegawn | |
| 5,883,797 A | 3/1999 | Amaro et al. | |
| 5,889,392 A | 3/1999 | Moore et al. | |
| 5,892,933 A | 4/1999 | Voltz | |
| 5,905,370 A | 5/1999 | Bryson | |
| 5,917,719 A | 6/1999 | Hoffman et al. | |
| 5,929,618 A | 7/1999 | Boylan et al. | |
| 5,929,620 A | 7/1999 | Dobkin et al. | |
| 5,935,252 A | 8/1999 | Berglund et al. | |
| 5,940,785 A * | 8/1999 | Georgiou et al. | 702/132 |
| 5,943,227 A | 8/1999 | Bryson et al. | |
| 5,946,495 A | 8/1999 | Scholhamer et al. | |
| 5,990,669 A | 11/1999 | Brown | |
| 5,994,885 A | 11/1999 | Wilcox et al. | |
| 6,005,377 A | 12/1999 | Chen et al. | |
| 6,021,059 A | 2/2000 | Kennedy | |
| 6,055,163 A | 4/2000 | Wagner et al. | |
| 6,057,607 A | 5/2000 | Rader, III et al. | |
| 6,079,026 A | 6/2000 | Berglund et al. | |
| 6,100,676 A | 8/2000 | Burstein et al. | |
| 6,111,396 A | 8/2000 | Line et al. | |
| 6,115,441 A | 9/2000 | Douglass et al. | |
| 6,121,760 A | 9/2000 | Marshall et al. | |
| 6,136,143 A | 10/2000 | Winter et al. | |
| 6,137,280 A | 10/2000 | Ackermann | |
| 6,150,803 A | 11/2000 | Varga | |
| 6,157,093 A | 12/2000 | Giannopoulos et al. | |
| 6,157,182 A | 12/2000 | Tanaka et al. | |
| 6,160,697 A | 12/2000 | Edel | |
| 6,163,143 A | 12/2000 | Shimamori | |
| 6,163,178 A | 12/2000 | Stark et al. | |
| 6,170,062 B1 | 1/2001 | Henrie | |
| 6,177,783 B1 * | 1/2001 | Donohue | 323/272 |
| 6,177,787 B1 | 1/2001 | Hobrecht | |
| 6,181,029 B1 | 1/2001 | Berglund et al. | |
| 6,191,566 B1 | 2/2001 | Petricek et al. | |
| 6,194,856 B1 | 2/2001 | Kobayashi et al. | |
| 6,194,883 B1 | 2/2001 | Shimamori | |
| 6,198,261 B1 | 3/2001 | Schultz et al. | |
| 6,199,130 B1 | 3/2001 | Berglund et al. | |
| 6,208,127 B1 | 3/2001 | Doluca | |
| 6,211,579 B1 | 4/2001 | Blair | |
| 6,246,219 B1 | 6/2001 | Lynch et al. | |
| 6,249,111 B1 | 6/2001 | Nguyen | |
| 6,262,900 B1 | 7/2001 | Suntio | |
| 6,288,595 B1 | 9/2001 | Hirakata et al. | |
| 6,291,975 B1 | 9/2001 | Snodgrass | |
| 6,294,954 B1 | 9/2001 | Melanson | |
| 6,298,449 B1 * | 10/2001 | Carter | 713/340 |
| 6,304,066 B1 | 10/2001 | Wilcox et al. | |
| 6,304,823 B1 | 10/2001 | Smit et al. | |
| 6,320,768 B1 | 11/2001 | Pham et al. | |
| 6,351,108 B1 | 2/2002 | Burstein et al. | |
| 6,355,990 B1 | 3/2002 | Mitchell | |
| 6,366,069 B1 | 4/2002 | Nguyen et al. | |
| 6,370,047 B1 | 4/2002 | Mallory | |
| 6,373,334 B1 | 4/2002 | Melanson | |
| 6,385,024 B1 | 5/2002 | Olson | |
| 6,392,577 B1 | 5/2002 | Swanson et al. | |
| 6,396,169 B1 | 5/2002 | Voegli et al. | |
| 6,396,250 B1 | 5/2002 | Bridge | |
| 6,400,127 B1 | 6/2002 | Giannopoulos | |
| 6,411,071 B1 | 6/2002 | Schultz et al. | |
| 6,411,072 B1 | 6/2002 | Feldman | |
| 6,414,864 B1 | 7/2002 | Hoshi | |
| 6,421,259 B1 | 7/2002 | Brooks et al. | |
| 6,429,630 B2 | 8/2002 | Pohlman et al. | |
| 6,448,745 B1 | 9/2002 | Killat | |
| 6,448,746 B1 | 9/2002 | Carlson | |
| 6,456,044 B1 | 9/2002 | Darmawaskita | |
| 6,465,909 B1 | 10/2002 | Soo et al. | |
| 6,465,993 B1 | 10/2002 | Clarkin et al. | |
| 6,469,478 B1 | 10/2002 | Curtin | |
| 6,469,484 B2 | 10/2002 | L'Hermite et al. | |
| 6,476,589 B2 | 11/2002 | Umminger et al. | |
| 6,556,158 B2 | 4/2003 | Steensgaard-Madsen | |
| 6,559,684 B2 | 5/2003 | Goodfellow | |
| 6,563,294 B2 | 5/2003 | Duffy et al. | |
| 6,583,608 B2 | 6/2003 | Zafarana et al. | |
| 6,590,369 B2 | 7/2003 | Burstein et al. | |
| 6,608,402 B2 | 8/2003 | Soo et al. | |
| 6,614,612 B1 | 9/2003 | Menegoli et al. | |
| 6,621,259 B2 | 9/2003 | Jones et al. | |
| 6,651,178 B1 | 11/2003 | Voegeli et al. | |
| 6,665,525 B2 | 12/2003 | Dent et al. | |
| 6,683,494 B2 | 1/2004 | Stanley | |
| 6,686,831 B2 | 2/2004 | Cook | |
| 6,693,811 B1 | 2/2004 | Bowman et al. | |
| 6,717,389 B1 | 4/2004 | Johnson | |
| 6,731,023 B2 | 5/2004 | Rothleitner et al. | |
| 6,744,243 B2 | 6/2004 | Daniels et al. | |
| 6,771,052 B2 | 8/2004 | Ostojic | |
| 6,778,414 B2 | 8/2004 | Chang et al. | |
| 6,788,033 B2 | 9/2004 | Vinciarelli | |
| 6,788,035 B2 | 9/2004 | Bassett et al. | |
| 6,791,298 B2 | 9/2004 | Shenai et al. | |
| 6,791,302 B2 | 9/2004 | Tang et al. | |
| 6,791,368 B2 | 9/2004 | Tzeng et al. | |
| 6,795,009 B2 | 9/2004 | Duffy et al. | |

| | | |
|---|---|---|
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,825,644 B2 | 11/2004 | Kernahan et al. |
| 6,828,765 B1 | 12/2004 | Schultz et al. |
| 6,829,547 B2 | 12/2004 | Law et al. |
| 6,833,691 B2 | 12/2004 | Chapuis |
| 6,850,046 B2 | 2/2005 | Chapuis |
| 6,850,049 B2 | 2/2005 | Kono |
| 6,850,426 B2 | 2/2005 | Kojori et al. |
| 6,853,169 B2 | 2/2005 | Burstein et al. |
| 6,853,174 B1 | 2/2005 | Inn |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |
| 6,933,709 B2 | 8/2005 | Chapuis |
| 6,933,711 B2 | 8/2005 | Sutardja et al. |
| 6,936,999 B2 | 8/2005 | Chapuis |
| 6,947,273 B2 | 9/2005 | Bassett et al. |
| 6,949,916 B2 | 9/2005 | Chapuis |
| 6,963,190 B2 | 11/2005 | Asanuma et al. |
| 6,965,220 B2 | 11/2005 | Kernahan et al. |
| 6,965,502 B2 | 11/2005 | Duffy et al. |
| 6,975,494 B2 | 12/2005 | Tang et al. |
| 6,975,785 B2 | 12/2005 | Ghandi |
| 6,977,492 B2 | 12/2005 | Sutardja et al. |
| 7,000,125 B2 | 2/2006 | Chapuis et al. |
| 7,000,315 B2 | 2/2006 | Chua et al. |
| 7,002,265 B2 | 2/2006 | Potega |
| 7,007,176 B2 | 2/2006 | Goodfellow et al. |
| 7,023,192 B2 | 4/2006 | Sutardja et al. |
| 7,023,672 B2 | 4/2006 | Goodfellow et al. |
| 7,047,110 B2 | 5/2006 | Lenz et al. |
| 7,049,798 B2 | 5/2006 | Chapuis et al. |
| 7,068,021 B2 | 6/2006 | Chapuis |
| 7,080,265 B2 | 7/2006 | Thaker et al. |
| 7,141,956 B2 | 11/2006 | Chapuis |
| 7,190,754 B1 | 3/2007 | Chang et al. |
| 7,266,709 B2 | 9/2007 | Chapuis et al. |
| 7,301,313 B1 | 11/2007 | Hart et al. |
| 7,315,157 B2 | 1/2008 | Chapuis |
| 7,315,160 B2 | 1/2008 | Fosler |
| 7,359,643 B2 | 4/2008 | Aronson et al. |
| 7,394,445 B2 | 7/2008 | Chapuis et al. |
| 7,584,371 B2 | 9/2009 | Zhang |
| 2001/0052862 A1 | 12/2001 | Roelofs |
| 2002/0070718 A1 | 6/2002 | Rose |
| 2002/0073347 A1 | 6/2002 | Zafarana et al. |
| 2002/0075710 A1 | 6/2002 | Lin |
| 2002/0104031 A1 | 8/2002 | Tomlinson et al. |
| 2002/0105227 A1 | 8/2002 | Nerone et al. |
| 2002/0144163 A1 | 10/2002 | Goodfellow et al. |
| 2003/0006650 A1 | 1/2003 | Tang et al. |
| 2003/0067404 A1 | 4/2003 | Ruha et al. |
| 2003/0122429 A1 | 7/2003 | Zhang |
| 2003/0137912 A1 | 7/2003 | Jeon |
| 2003/0142513 A1 | 7/2003 | Vinciarelli |
| 2003/0201761 A1 | 10/2003 | Harris |
| 2004/0080044 A1 | 4/2004 | Moriyama et al. |
| 2004/0093533 A1 | 5/2004 | Chapuis et al. |
| 2004/0123164 A1 | 6/2004 | Chapuis et al. |
| 2004/0123167 A1 | 6/2004 | Chapuis |
| 2004/0174147 A1 | 9/2004 | Vinciarelli |
| 2004/0178780 A1 | 9/2004 | Chapuis |
| 2004/0189271 A1 | 9/2004 | Hanson et al. |
| 2004/0201279 A1 | 10/2004 | Templeton |
| 2004/0225811 A1 | 11/2004 | Fosler |
| 2004/0246754 A1 | 12/2004 | Chapuis |
| 2005/0093594 A1 | 5/2005 | Kim et al. |
| 2005/0117376 A1 | 6/2005 | Wilson |
| 2005/0146312 A1 | 7/2005 | Kenny et al. |
| 2005/0200344 A1 | 9/2005 | Chapuis |
| 2005/0289373 A1 | 12/2005 | Chapuis et al. |
| 2006/0022656 A1 | 2/2006 | Leung et al. |
| 2006/0085656 A1 | 4/2006 | Betts-LaCroix |
| 2006/0132108 A1 * | 6/2006 | Teggatz et al. ............... 323/282 |
| 2006/0149396 A1 | 7/2006 | Templeton |
| 2006/0174145 A1 | 8/2006 | Chapuis et al. |
| 2006/0244570 A1 | 11/2006 | Leung et al. |
| 2006/0250120 A1 | 11/2006 | King |
| 2007/0114985 A1 | 5/2007 | Latham et al. |
| 2008/0074373 A1 | 3/2008 | Chapuis et al. |
| 2008/0238208 A1 | 10/2008 | Potter et al. |

FOREIGN PATENT DOCUMENTS

| | | |
|---|---|---|
| EP | 0255258 | 2/1988 |
| EP | 0315366 | 5/1989 |
| EP | 0401562 | 12/1990 |
| EP | 0660487 | 6/1995 |
| EP | 0875994 | 11/1998 |
| EP | 0877468 | 11/1998 |
| EP | 0997825 | 5/2000 |
| GB | 2377094 | 12/2002 |
| JP | 60-244111 | 12/1985 |
| JP | 1185329 | 3/1999 |
| JP | 11-289754 | 10/1999 |
| KR | 200284495 | 8/2002 |
| RU | SU1359874 | 12/1985 |
| RU | SU1814177 | 5/1993 |
| WO | WO93/19415 | 9/1993 |
| WO | WO01/22585 | 3/2001 |
| WO | WO02/31943 | 4/2002 |
| WO | WO02/31951 | 4/2002 |
| WO | WO02/50690 | 6/2002 |
| WO | WO02/063688 | 8/2002 |
| WO | WO 03/030369 | 4/2003 |

OTHER PUBLICATIONS

25 Watt DC-DC Converters, Melcher The Power Partners and Power-One Group of Companies, Industrial Environment, Apr. 4, 1999, DC-DC Converters <40 Watt, G Series, 16 Pages.

-48V Programmable Hot Swap Sequencing Power Controller, Summit Microelectronics, Inc., Oct. 30, 2002, SMH4804, 41 Pages.

33702 Microprocessor Power Supply (3.0A), Analog Products MC33702 Fact Sheet; Motorola/Digital dna/Power Management Switchings; Jan. 1, 2003, pp. 1-4.

Accelerator-Control-System Interface for Intelligent Power Supplies, S. Cohen, Los Alamos National Laboratory, Jan. 1, 1992, pp. 183-186.

Advanced Configuration and Power Inerface Specification, Intel Corporation, Microsoft Corporation, Toshiba Corp, Feb. 2, 1999, Revision 1.0b, 387 Pages.

Advantages of Microcontrollers in DC-DC Converters, Galaxy Power, Jan. 1, 2003 IBM Symposium, Real Solutions for Distributed Power, 8 Pages.

Agilent E364xA Single Output DC Power Supplies, User's Guide; Agilent Technologies, Part No. E3640-90001, Jan. 1, 2000, 207 pages.

Agilent E3640A-E3649A Programmable dc Power Supplies, Data Sheet; Agilent Technologies, Jan. 1, 2000, 4 pages.

Architecture and IC implementation of a digital VRM controller, Jinwen, Xiao et al, 32nd Annual IEEE Power Electronics Specialists Conference. PESC 2001. Conference Proceedings. Vancouver, Canada, Jun. 17-21, 2001, Annual Power Electronics Specialists Conference, New York, NY : IEEE, US, vol. vol. 1 of 4. Conf. 32, Jun. 17, 2001, pp. 38-47, XP010559121 ISBN: 0-7803-7067-8, figure 7.

Automating the Design of a Generic Modular Power System for the Global Market, Pedersen, George, Briggs, Steve; Massey, Paul, Advance Power Raynham Road, Bishops Stortford, Herts.; Jan. 1, 1999, CM23 5PF UK.

Auto Sequence Programming Examples for GPIB-M, Xantrex Technology, Inc., Nov. 27, 2002, 1.0a, 4 pages.
BE510 / BE510S Modules—Bipolar DC Source from 100mV to 20V and from 100nA to 4A, Innovative Test Systems; BE510 Version II, Issue 9, Nov. 12, 2000, 3 Pages.
BE52x Modules—Multi-range bipolar DC sources from 30V to 500V, 90W, Innovative Test Systems; BE52x Version A, Issue 9, Aug. 3, 2001, 3 pages.
Characteristics of Automated Power System Monitoring & Management Platforms, Hawkins, John M.; Telepower Australia Pty Ltd, Jan. 1, 2000, telepower@telepower.com.au,IEEE, Intelec, 5 Pages.
Chemistry-Independent Battery Chargers, Maxim Integrated Products, Dec. 1, 2002, 19-1158, Rev 1, MAX1647/MAX1648, 25 Pages.
Continuing Evolution of Intelligence for Telecommunications Power Plants, The Godby, Jimmy, Apr. 1, 1996, IEEE, 0-7803-3507-4/96, pp. 70-75.
Controlling and Alarming DC Power Plants via the Internet, Cosentino, Anthony P.; Sullivan, Michael C.; Baxter, Richard V. Jr.; Loeck, JonPower Conversion Products, LLC and Pensar Corporation, Jan. 1, 1998, 6 pages.
Current-Fed Multiple-Output Power Conversion, Seamus O'Driscoll; John G. Hayes and Michael G. Egan; Artesyn Technologies; Dept. of Electrical Engineering, University College Cork, Ireland, Dec. 3, 2003, 7 pages.
Dali Manual, Dali AG, Digital Addressable Lighting Interface Activity Group, ZVEI-Division Luminaires, Jan. 1, 2001, pp. 1-62.
Defendant's Artesyn Technologies, Inc.'s Preliminary Invalidity Contentions—(*Power-One, Inc.* vs. *Artesyn Technologies, Inc.* et al.), Civil Action No. 2-05-CV-463 (LED), United States District Court for the Eastern District of Texas; Apr. 26, 2006.
DHP Series DC Power Supplies, IEEE 488.2/RS-232 Options Programming Manual; Sorensen, Division of Elgar Electronics Corporation, Document No. M550005-01 Rev B, Jul. 29, 2002, 32 pages.
Digital Addressable Lighting Interface (DALI): An Emerging Energy-Conserving Lighting Solution, The Ronat, Odile; International Rectifier, Apr. 9, 2002, TP, pp. 1-6.
Digital Multiphase Power from Primarion and Intersil Changing the Landscape of Processor Power, Primarion, Inc., White Paper, Sep. 12, 2002, 6 pages.
Digitally Controlled Power Systems: How Much Intelligence is Needed and Where it Should be Lock, Tom; RELTEC Corporation, Jan. 1, 1998, IEEE, 4 pages.
Digitally-Controlled SMPS Extends Power System Capabilities Vinsant, Ron; DiFiore, John; Clarke, Richard, PCIM, Jun. 1, 1994, pp. 30-37.
Digitally Controlled Zero-Voltage-Switched Fullbridge Converter, A Rinne, Karl-Heinz; Theml, Klaus; Duigan, Joseph; McCarthy, Oliver, Power Conversion, Jun. 1, 1994 Proceedings, pp. 317-324.
Distributed Intelligence and Modular Architecture for Next Generation DC Power System, Duguay, Louis; Got, Pierre, Astec Advanced Power Systems, Quebec, Canada; Jan. 1, 2000, 6 pgs.
Distributed Power Hot Swap Controller, Summit Microelectronics, Inc., Mar. 19, 2001, SMH4804; 2050 2.3, 32 pages.
Dual 550kHz Synchronous 2-Phase Switching Regulator Controller, Linear Technology, Jan. 1, 1998, LTC1702, 36 Pages.
Dual Smart Card Interface TDA8020HL, Philips Semiconductors, Integrated Circuits, Data Sheet, Feb. 24, 2001, I2C Bus,TDA8020HL, Objective Specification v4.2 Supersedes data of Jan. 2001 File under Integrated Circuits, ICXX, 22 Pages.
Dual Smart Card Interface TDA8020HL/C2, Christophe Chausset, Philips Semiconductors, May 20, 2003, Application Note, TDA8020HL/C2, AN10232, 28 Pages.
Electronic Products Power Supply Special: Programmable Supplies Use Switch-Mode Topologies, Birman, Paul; Nercessian, Sarkis; Kepco, Inc. Flushing NY; vol. 37, No. 10, Electronic Products, Mar. 1, 1995; The Engineer's Magazine of Product Technology; Power Supply Special; DSO Samples Single Shots at 10 Gsamples/s Speech Recognition on a Single Chip LCD Has Flat-Panel Benefits At CRT Cost Product Update: High-Performance OP AMPS; A Hearst Business Publication; pp. 1, 5, 33-34.
Fieldbus System Engineering Guidelines, Fieldbus Foundation, 2003-2004, pp. 1-94.

High Efficiency, 2-Phase Synchronous Step-Down Switching Regulators, Linear Technology, Jan. 1, 1998, LTC1628/LTC1628-PG, 32 Pages.
High Efficiency Synchronous Step-Down Switching Regulator Linear Technology, Jan. 1, 1998, LTC1735, 33 Pages.
High-frequency digital controller IC for DC/DC converters, Patella B J et al; APEC 2002. 17th. Annual IEEE Applied Power Electronics Conference and Exposition. Dallas, TX, Mar. 10-14, 2002, Annual Applied Power Electronics Conference, New York, NY: IEEE, US, vol, vol. 2 of 2. Conf. 17, Mar. 10, 2002, pp. 374-380, XP010582947, ISBN: 0-7803-7404-5, p. 375, right-hand column; figure 3.
Highly Programmable Voltage Supply Controller and Supervisory Circuit, Summit Microelectronics, Inc., Jun. 7, 2001, SMS44, Preliminary, 19 Pages.
IEEE Standard Codes, Formats, Protocols, and Common Commands for User with IEEE Std 488.1-1987, IEEE Standard Digital Interface for Programmable Instrumentation, IEEE Std 488.2-1992; IEEE, Jun. 18, 1992, ISBN 1-55937-238-9, 254 pages.
IMPI Intelligent Platform Management Bus Communications Protocol Specification v1.0, Intel, Hewlett-Packard, NEC, Dell, Document Revision 1.0, Nov. 15, 1999, 39 pages.
Implementing a Nationwide Energy Management System, Sjöberg, Stig; Hedberg, Tommy; Selberg, Lars; Wikström, Rober, Jan. 1, 2000.
Infinite Impulse Response, Wikipedia, http://en.wikipedia.org/wiki/IIR, May 2, 2006, pp. 1-4.
In-Situ Transfer Function Analysis, 2006 Digital Power Forum Presentaiton; Mark Hagen, Texas Instruments Digital Power Group, Jul. 1, 2006.
Installation Guide MPS Mainframe Model 66000A, Agilent Technologies, Agilent Part No. 66000-90001, 1991-Apr. 2000, 26 pages.
In-System Network Analyzer, 2006 Digital Power Forum Prensentaiton, Silicon Laboratories, Jul. 7, 2006.
Integrate Internet Solutions Into Your Energy Management Network, Sarkinen, Johan; Lundin, Ola; Jun. 1, 1998, 7 pages.
Integrity-One: Installation, Operation and Maintenance Manual, Power-One, Inc., 1999-2003 Version 1.2 (P025374-P025559).
Integrity-One Power System—Rack System, Data Sheet, Power-One, Inc., Nov. 1, 2002, (P025580-P025583).
Intelligent, Fault Tolerant, High Power, Distributed Power System for Massively Parallel Processing Computers, An Burns, J.; Riel, J.; DiBene, T., IEEE, May 1, 1994, 0-7803-1456-5/94, pp. 795-798.
Intelligent Platform Management Interface Specification v1.5 Intel, Hewlett-Packard, NEC, Dell, Document Revision 1.1, Feb. 20, 2002, 459 pages.
Intelligent Power Supply Controller Rumrill, R.S.; Reinagel, D.J.; IEEE, Aug. 1, 1991, 0-7803-0135-8/91, PAC 1991, pp. 1537-1539.
KEKB Power Supply Interface Controller Module, Akiyama, Nakamura, Yoshida, Kubo, Yamamoto, Katoh; High Energy Accelerator Research Organization, 1-1 Ohio, Tsukuba 305, Japan; International Conference on Accelerator and Large Experimental Physics and Control Systems, Jan. 1, 1997, Beijing, China 4 pgs.
Low Voltage Study Workshop Report, Charles E. Mullett; Lou Pechi; PSMA, Power Sources Manufacturers Association, The Multinational Power Electronics Association, Jan. 1, 2001, 150 Pages.
Magnet Power Supply Control System in KEKB Accelerators, Akiyama, Katoh, Kubo, Yamamoto, Yoshida; KEK, Tsukuba, Japan; International Conference on Accelerator and Large Experimental Physics and Control Systems, Jan. 1, 1999, Triest, Italy pp. 406-408.
Magnet Power Supply as a Network Object, Cohen, S.; Stuewe, R.; IEEE, Aug. 1, 1991, 0-7803-0135-8/91, PAC 1991, pp. 929-931.
Market Trends Toward Enhanced Control of Electronic Power Systems, Miles, F.M.; Danak, R.K.; Wilson, T.G.; Suranyi, G.G.; IEEE, Jan. 1, 1993, 0-7803-0982-0/93, pp. 92-98.
Memorandum Opinion and Order, *Power One* v *Artesyn Technologies, Inc.*; Civil Action 2:05cv463, Mar. 22, 2007.
Microchip AN811, The RS-232/DALI Bridge Interface, Microchip Technology Inc., Jan. 1, 2002, DS00811A, pp. 1-8.
Microchip AN809, Digitally Addressable DALI Dimming Ballast, Microchip Technology Inc., Jan. 1, 2002, DS00809B, pp. 1-18.
Microchip AN703, Using the MCP320X 12-Bit Serial A/D Converter with Microchip PICmicro® Devices, Microchip Technology Inc., Jan. 1, 2002, DS00703A, pp. 1-25.

Microchip PIC16C781/782 Data Sheet, 8-bit CMOS Microcontrollers with A/D, D/A, OPAMP, Comparators and PSMC, Microchip Technology Inc., Jan. 1, 2001, pp. 1- 184.

Microprocessor Core Supply Voltage Set by 1 2 C Bus Without VID Lines—Design Note 279, Mark Gurries; Linear Technology—Design Notes, Jan. 7, 2002, 2 Pages.

Motorola Switch Mode Power Supply with Multiple Linear Regulators and High Speed CAN Transceiver, Motorola, Inc. 2002; digital dna; Analog Marketing; Rev. 2.5, Nov. 1, 2002; 33394; Multi-Output Power Supply Semiconductor Technical Data.

NEBS Compliant Board Level Power System, Thomas J. DeLurio, Mikhail Guz and John Ng; Summit Microelectronics, Power One, Oct. 20, 2002, 7 Pages.

New Applications Demand Programmable Power Supplies/Sources, O'Shea, Paul; http://www.evaluationengineering.com/archive/articles/0997powr.htm, Nelson Publishing, Inc., Jan. 1, 1997, 8 pages.

New Digital Power Delivery Architecture, Bob Carroll, Primarion, Sep. 1, 2004, 5 Pages.

Non-Impact Printer Power and Motor Control System on a Chip, Masson, James; Barrow, Steven; IEEE, Apr. 1, 1995, IEEE Catalogue No. 95TH8025, 0-7803-2423-4/95, pp. 98-103.

Operating and Service Manual MQ Series DC Power Supplies, Magna-Power Electronics, Inc., Dec. 19, 2002, 48 pages.

Operating and Service Manual SBC488A, Magna-Power Electronics, Inc., Dec. 19, 2002, 58 pgs.

Operating and Service Manual SQ Series, DC Power Supplies, Magna-Power Electronics, Inc., Dec. 16, 2002, 48 pgs.

Operating Manual for Internal RS-232 Interface for XT 60 Watt and HPD 300 Watt Series Programmable DC Power Supplies, Xantrex Technology, Inc., Jun. 1, 2002, 59 pages.

Operation and Maintenance Process Model for Energy Management, An Lundin, Ola; Ericsson Components AB, Energy Systems Division, Jan. 1, 1999, S-164 81 KISTA—Stockholm, Sweden; 7 pages.

Optimizing Power Product Usage to Speed Design Validation Testing, Application Note 1434; Agilent Technologies, Nov. 22, 2002, 16 pages.

PCS Controller, Data Sheet, Power-One, Inc. Nov. 1, 2002 (P025584-P025585).

PCX-150A 150 Amp Pulsed Current Source Operation Manual, Version 3.0, Directed Energy, Inc., Jan. 1, 2001, Document No. 9100-0212 R4, 31 pages.

PMP 25 Rectifier Module, Data Sheet, Power-One, Inc., Undated, (P025602-P025603).

Power Distribution Systems for Future Homes, Lee, Po-Wa; Lee, Yim-Shu; Lin, Bo-Tao; IEEE, Aug. 1, 1999, 0-7803-5769-88/99, pp. 1140-1146.

Power LAN for Telecommunication Power Supply Equipment, A Vun C.H., Nicholas; C.T., Lau; B.S., Lee; IEEE TENCON '93 Beijing, Jan. 1, 1993, pp. 24-27.

Power Management Solutions for Networking Applications, Darmon, Luc; Smart Networks Developer Forum 2003, Jun. 4-6, 2003, Euro-Disney Paris, France, Motorola digital dna; pp. 1-26; www.motorola.com/sndf.

Power System Controller in an Intelligent Telecom Rectifier Plant Roth, Ueli; IEEE, Aug. 1, 1992, 0-7803-0779-8/92, pp. 476-483.

Preliminary Information 1.5A Switch-Mode Power Supply with Linear Regulator, 33701; Power Supply Integrated Circuit; Motorola Seminconductor Technical Data; Analog Marketing MC33701/D Rev. 1.0, May 1, 2003; Motorola digial dna; pp. 1-24.

Presenting DALI, AG DALI, Jul. 1, 2003, pp. 1-17.

Programmable Four-Channel Step-Down DC/DC Converter, Texas Instruments, Oct. 1, 2001, TPS54900, 16 Pages.

Programming Guide Series 661xxA MPS Power Modules, Agilent Technologies, Agilent Part No. 5959-3362, 1991-2000, 114 pages.

Programmer Manual, PS2520G & PS2521G Programmable Power Supplies, Tektronix, 070-9197-00, Jan. 1, 1995, 70 pages.

Power Management for Communications: Product Information, Summit Microelectronics, Inc., Jan. 23, 2001, 168 Pages, http://www.summitmicro.com.

Power Management for Communications: Corporate Overview, Summit Microelectronics Inc., Oct. 1, 2002, 213 Pages.

Power Semiconductors and Power Supplies—The Building Blocks of the Digital Power Revolution, Todd Cooper and Holman Harvey; Stephens, Inc. Investment Bankers, Sep. 1, 2000, 132 Pages.

Quad Tracking Power Supply Manager, Summit Microelectronics, Inc., Mar. 4, 2002, SMT4004, 35 Pages.

Quantization Resolution and Limit Cycling in Digitally Controlled PWM Converters, Peterchev, Angel V.; Sanders, A.V.; Electrical Engineering and Computer Science; UC Berkley; Power Electronics Specialists Conference, 2001.PESC, vol. 2, Jun. 17-21, 2001; pp. 465-471; XP002274573.

R Option, S Option DC Power Supplies, IEEE 488.2/RS-232 Programming Manual; Power Ten, Document No. M550013-01 Rev C, Jun. 25, 2002, 56 pages.

SCPI Programming Examples for GPIB-M, Xantrex Technology, Inc., Nov. 26, 2002, 1.0, 3 pages.

Service Guide for Agilent 6610xA Power Modules, Agilent Technologies, Agilent Part No. 5959-3364, Dec. 1, 2002, 101 pages.

Silicon Labs Preliminary Invalidity Contentions, Civil Action No. 2-05-CV-463 (LED)—May 26, 2006 (U.S. District Court Eastern District of Texas).

Simple digital hardware to control a PFC converter, A Zumel P. et al; IECON'01. Proceedings of the 27th. Annual Conference of the IEEE Industrial Electronics Society. Denver, CO, Nov. 29-Dec. 2, 2001, Annual Conference of the IEEE Industrial Electronics Society, New York, NY : IEEE, US, v01. vol. 1 of 3. Conf. 27, Nov. 29, 2001, pp. 943-948, XP010572905 ISBN: 0-7803-7108-9, paragraph [IIIC].

Single-Inductor Multiple-Output Switching Converters, Wing-Hung Ki and Dongsheng Ma; Integrated Power Electronics Laboratory, Department of Electrical and Electronic Engineering, The Hong Kong University of Science and Technology, Clear Water Bay, Hong Kong SAR, China, Jan. 1, 2001, 6 Pages.

Six-Channel Power Supply Supervisor and Cacsade Sequence Controller, Summit Microelectronics, Inc., Jul. 16, 2003, SMS66, Preliminary Information, 26 Pages.

SMBus Controls CPU Voltage Regulators without VID Pins, Mark Gurries, Design Ideas, Linear Technology Magazine, Sep. 1, 2001, 2 Pages.

SMBus VID Voltage Programmers, Linear Technology, Jan. 1, 2001, LTC1699 Series, 20 Pages.

SMH4804, SMP9210 and SMT4004 Telecom Reference Design, Summit Microelectronics, Inc., Sep. 5, 2002, Application Note 25, 17 Pages.

Synchronization of Multiple Voltage Regulator Outputs, Mueller, M.W.; et al., IBM Technical Disclosure Bulletin, Jun. 1, 1999; 2 pages.

System Management Bus (SMBus) Specification Version 2., Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.

System Management Bus Specification, Revision 1.1, Smart Battery System Specifications, Revision 1.1, Dec. 11, 1998; Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG. 39 pgs.

Technical Overview, Foundation™ fieldbus, Freedom to Choose. Power to Integrate, Fieldbus Foundation, Jan. 1, 2003, FD-043 Rev 3.0, pp. 1-37.

Testing Intelligent Power Supplies for the Los Alamos National Laboratory Accelerator Complex, Sturrock, J.C. ; Cohen, S.; Weintraub, B.L.; Hayden, D.J.; Archuletta, S.F. ; Los Alamos National Laboratory, Jan. 1, 1992, pp. 217-219.

Uniform Language for Accessing Power Plants—Human-Machine Language, ANSI T1.317-1993; American National Standards Institute, Dec. 14, 1993, 55 pages.

User's Guide Series 661xxA MPS Power Modules & Model 66001A MPS Keyboard, Agilent Technologies, Agilent Part No. 5959-3386, 1992-Apr. 2000, 53 pages.

User Manual, PS2520, PS2520G, PS2521 & PS2521G Programmable Power Supplies, Tektronix, 070-9196-00, Jan. 1, 1995, 56 pages.
Volume 1: Syntax and Style, SCPI Consortium, May 1, 1999, Version 1999.0, 67 pages.
Volume 1: Syntax and Style, Standard Commands for Programmable Instruments (SCPI) Consortium, May 1, 1997, Version 1997.0, 68 pages.
Volume 2: Command Reference, SCPI Consortium, May 1, 1999, Version 1999.0, 565 pages.
Volume 2: Command Reference, SCPI Consortium, May 1, 1997, Version 1997.0, 506 pages.
Volume 3: Data Interchange Format, SCPI Consortium, May 1, 1999, Version 1999.0, 72 pages.
Volume 3: Data Interchange Format, SCPI Consortium, May 1, 1997, Version 1997.0, 73 pages.
Volume 4: Instrument Classes, SCPI Consortium, May 1, 1999, Version 1999.0, 115 pages.
Volume 4: Instrument Classes, SCPI Consortium, May 1, 1997, Version 1997.0, 58 pages.
VXI Bus Programmable DC Power Supplies, Advanced Power Designs, Inc., Irvine, CA; Jan. 1, 1993, 5 pages.
Why have Monitoring?, Shawyer, P.; Hobbs. P.; McLeod, A.; Jan. 1, 2001, 8 Pages.
Wide Operating Range, No Sense Step-Down Controller, Linear Technology, Jan. 1, 2001, LTC1778/LTC1778-1, 24 Pages.
Wide Operating Range, No Sense Step-Down DC-DC Controller with SMBus Programming, Linear Technology, Jan. 1, 2001, LTC1909-8, 34 Pages
Microturbine Power Conversion Technology Review, Staunton et al.; Oak Ridge National Laboratory Technical Report; Apr. 8, 2003; 40 pages.
Microcomputer Control of DC/DC Converters for Photovoltaic Applications, Peracaula et al.; Dept. of Electronics Engineering, Industrial Electronics Group—Technical University of Catalonia, Spain; 1991; 4 pgs.
"Automated Power Distribution System Hardware" Anderson et al.; Aug. 6, 1989; pp. 579-584.
"MicroSCADA Technology Rev. 8.4.2 Documentation CD: Application Objects, Chapter 5. Data Objects" CD-ROM; Sep. 18, 1998, ABB, XP002481365; 11 Pages.
"Modern User Interface Revolutionizes Supervisory Systems" D'Armour et al.; IEEE Computer Applications in Power; vol. 7, No. 1; Jan. 1, 1994; pp. 34-39.
"Open Architecture Distributed Processing—The Modern Design for Electric Power Network Automation" Hissey et al.; IEEE Region 9 Colloquium; Sep. 1990; pp. 150-161; XP010038436.

* cited by examiner

SYSTEM FOR CONTROLLING AN ARRAY OF POINT-OF-LOAD REGULATORS AND AUXILIARY DEVICES

RELATED APPLICATION DATA

This application claims priority as a continuation-in-part pursuant to 35 U.S.C. §120 to patent application Ser. No. 11/760,660 filed Jun. 8, 2007, which is a continuation of patent application Ser. No. 11/354,550 filed Feb. 14, 2006, now issued as U.S. Pat. No. 7,266,709 on Sep. 4, 2007.

BACKGROUND OF THE INVENTION

1. Field of the Invention

The present invention relates to power control systems, or more particularly, to a system to control, program and monitor an array of point-of-load regulators and other auxiliary devices.

2. Description of Related Art

With the increasing complexity of electronic systems, it is common for an electronic system to require power provided at several different discrete voltage and current levels. For example, electronic systems may include discrete circuits that require voltages such as 3v, 5v, 9v, etc. Further, many of these circuits require a relatively low voltage (e.g., 1v), but with relatively high current (e.g., 100 A). It is undesirable to deliver relatively high current at low voltages over a relatively long distance through an electronic device for a number of reasons. First, the relatively long physical run of low voltage, high current lines consumes significant circuit board area and congests the routing of signal lines on the circuit board. Second, the impedance of the lines carrying the high current tends to dissipate a lot of power and complicate load regulation. Third, it is difficult to tailor the voltage/current characteristics to accommodate changes in load requirements.

In order to satisfy these power requirements, it is known to distribute an intermediate bus voltage throughout the electronic system, and include an individual point-of-load ("POL") regulator, i.e., DC/DC converter, at the point of power consumption within the electronic system. Particularly, a POL regulator would be included with each respective electronic circuit to convert the intermediate bus voltage to the level required by the electronic circuit. An electronic system may include multiple POL regulators to convert the intermediate bus voltage into each of the multiple voltage levels. Ideally, the POL regulator would be physically located adjacent to the corresponding electronic circuit so as to minimize the length of the low voltage, high current lines through the electronic system. The intermediate bus voltage can be delivered to the multiple POL regulators using low current lines that minimize loss.

With this distributed approach, there is a need to coordinate the control and monitoring of the POL regulators of the power system. The POL regulators generally operate in conjunction with a power supply controller that activates, programs, and monitors the individual POL regulators. It is known in the art for the controller to use a multi-connection parallel bus to activate and program each POL regulator. For example, the parallel bus may communicate an enable/disable bit for turning each POL regulator on and off, and voltage identification (VID) code bits for programming the output voltage set-point of the POL regulators. The controller may further use additional connections to monitor the voltage/current that is delivered by each POL regulator so as to detect fault conditions of the POL regulators. A drawback with such a control system is that it adds complexity and size to the overall electronic system.

It is also known in the art to include various other devices in an electronic system for system supporting functions (also referred to as auxiliary devices). These devices may provide low power regulation, such as a linear regulator, low-drop out (LDO) linear regulator or other power supplies; device switching, such as machine-operated switches, magnetically operated control switches, thermal and magnetic relays, time delay relays, and actuators; motor control; temperature control, such as blowers and fans; visual indicator devices, such as lights, light emitting diodes (LEDs), video display monitors, gauges; peripheral devices; and the like. In some cases, it is desirable to coordinate the control over these auxiliary devices in concert with the POL regulators of the power system, such as to control the operation of a fan in synchronism with activation of a POL regulator; however, conventional distributed power system do not provide flexibility to control other auxiliary devices in addition to POL regulators.

Thus, it would be advantageous to have a system and method for controlling and monitoring POL regulators and other auxiliary devices within a distributed power system.

SUMMARY OF THE INVENTION

The present invention provides a system and method for controlling, programming and monitoring POL regulators and auxiliary devices within a distributed power system.

In an embodiment of the invention, a power control system comprises at least one programmable voltage regulator, at least one non-programmable auxiliary voltage regulator, and a system controller operatively connected to the at least one programmable voltage regulator and to said at least one auxiliary voltage regulator via a common serial data bus. The at least one programmable voltage regulator is adapted to provide a corresponding output voltage having characteristics defined by received programming data and to provide monitoring data reflecting operational status of the at least one programmable voltage regulator. The at least one non-programmable auxiliary voltage regulator is adapted to provide a corresponding output voltage in response to an enable signal. The system controller is adapted to send the programming data and receive the monitoring data via the serial data bus. A data monitoring circuit is operatively coupled to the at least one auxiliary voltage regulator to receive analog measurements therefrom and communicate corresponding monitoring data to the system controller.

A more complete understanding of the method and system for controlling and monitoring a plurality of POL regulators and auxiliary devices will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for controlling and monitoring POL regulators and auxiliary devices within a distributed power system. In the detailed description that follows, like element numerals are used to describe like elements illustrated in one or more figures.

Figure 1:
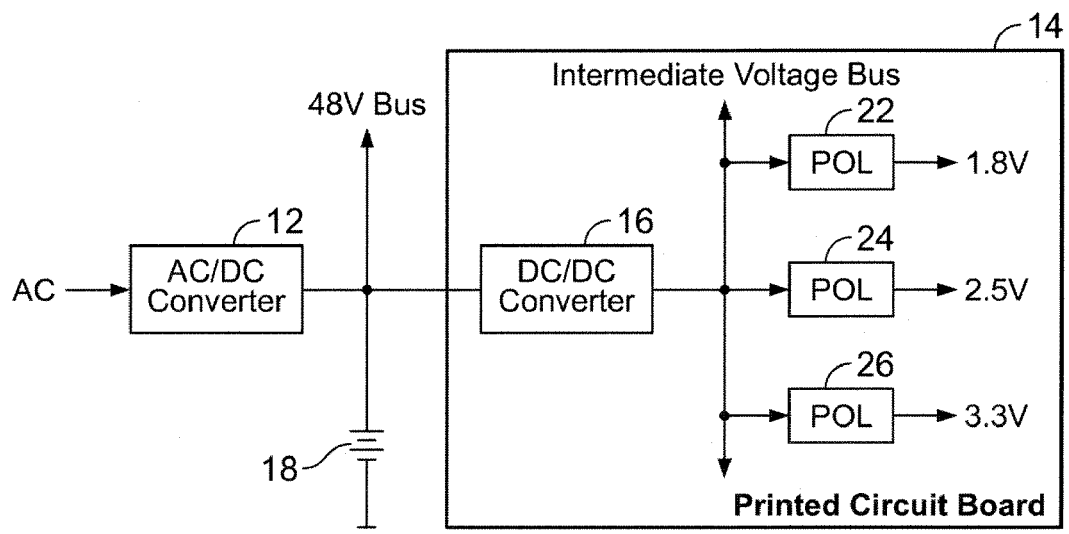
FIG. 1 depicts a prior art distributed power delivery system.

Referring first to FIG. 1, a prior art distributed power delivery system is shown. The prior art distributed power deliver system includes an AC/DC converter 12 that converts the available AC power into a primary DC power source, e.g., 48 volts. The primary DC power source is connected to a primary power bus that distributes DC power to plural electronic systems, such as printed circuit board 14. The bus may be further coupled to a battery 18 providing a back-up power source for the electronic systems connected to the primary power bus. When the AC/DC converter 12 is delivering DC power into the primary power bus, the battery 18 is maintained in a fully charged state. In the event of loss of AC power or fault with the AC/DC converter 12, the battery 18 will continue to deliver DC power to the primary power bus for a limited period of time defined by the capacity of the battery 18.

The printed circuit board 14 may further include a DC/DC converter that reduces the primary bus voltage to an intermediate voltage level, such as 5 or 12 volts. The intermediate voltage is then distributed over an intermediate power bus provided to plural circuits on the printed circuit board 14. Each circuit has an associated point-of-load ("POL") regulator located closely thereby, such as POLs 22, 24, and 26. Each POL regulator converts the intermediate bus voltage to a low voltage, high current level demanded by the electronic circuit, such as 1.8 volts, 2.5 volts, and 3.3 volts provided by POLs 22, 24, and 26, respectively. It should be appreciated that the voltage levels described herein are entirely exemplary, and that other voltage levels could be selected to suit the particular needs of electronic circuits on the printed circuit board 14. By locating the POLs 22, 24, 26 close to their corresponding electronic circuits, the length of the low voltage, high current lines on the printed circuit board 14 are minimized. Moreover, the intermediate power bus can be adapted to carry relatively low current, thereby minimizing power loss due to the line impedance. But, this distributed power delivery system does not provide a way to monitor and control the performance of the POLs 22, 24, 26.

Figure 2:
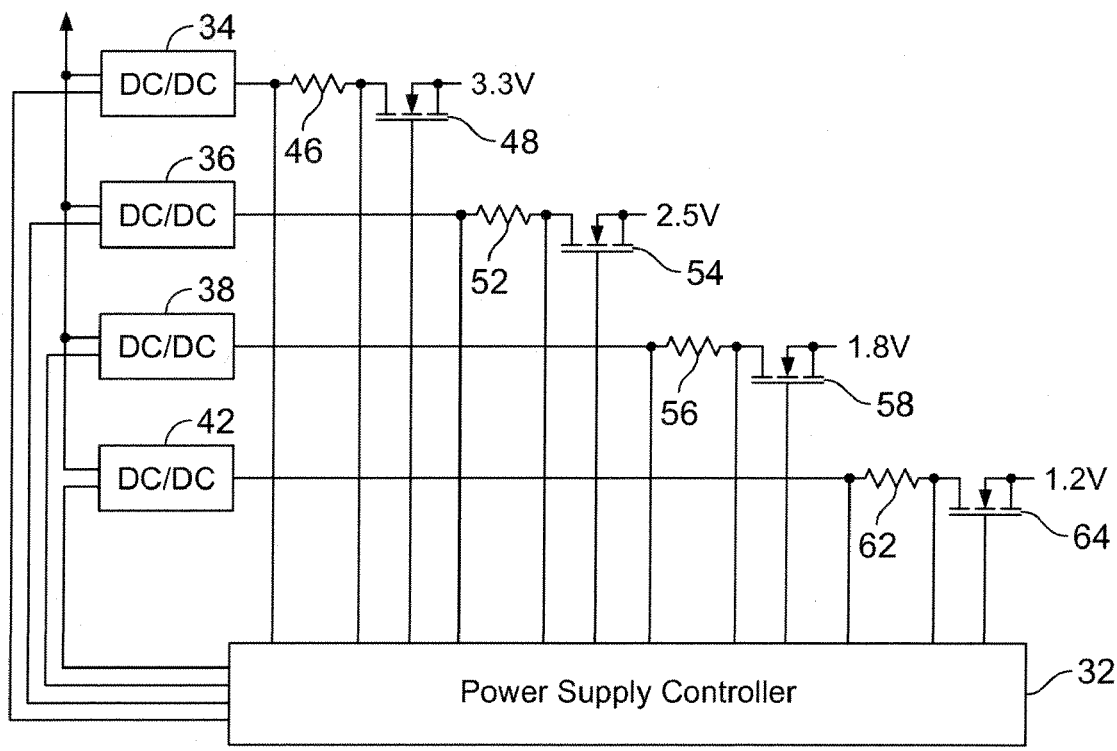
FIG. 2 depicts a prior art POL control system using a parallel control bus.

FIG. 2 illustrates a prior art DC/DC converter control system having a power supply controller 32 and a plurality of DC/DC converters 34, 36, 38, and 42. The DC/DC converters 34, 36, 38, and 42 are each connected to a power bus (as described above with respect to FIG. 1), which provides an input voltage. The DC/DC converters 34, 36, 38, and 42 each provide a low voltage, high current output that passes through respective sensing resistors 46, 52, 56, and 62 and respective switches 48, 54, 58, and 64. The controller 32 provides control signals to the DC/DC converters 34, 36, 38, and 42 via a plurality of six-bit parallel buses that each carry an enable/disable bit and five VID code bits. The VID code bits program the DC/DC converters for a desired output voltage/current level. The controller 32 also monitors the performance of the DC/DC converters 34, 36, 38, and 42 using the sensing resistors 46, 52, 56, and 62. Particularly, the controller 32 monitors the output voltage of each DC/DC converter by detecting the voltage at the output side of the sensing resistor, and monitors the output current through the sensing resistor by detecting the voltage across the sensing resistor. The voltage and current sensing for each DC/DC converter requires two separate lines, so eight separate lines are needed to sense the voltage and current condition of the exemplary four-converter system. Moreover, the controller 32 has a switch enable line connected to the gate terminals of switches 48, 54, 58, and 64, by which the controller 32 can shut off the output from any of the DC/DC controllers 34, 36, 38, and 42 or control the turn-on/off slew rate.

In an exemplary operation, the controller 32 provides control parameters (e.g., output voltage set-point) to the DC/DC converter 34 via the VID code portion of the six-bit parallel bus. The controller 32 then activates the DC/DC converter 34 via the enable/disable portion of the six-bit parallel bus. Once activated, the DC/DC converter 34 converts the power bus voltage (e.g., 48 volts) into a selected output voltage. The controller 32 then verifies that the output voltage is the desired voltage by measuring the voltage via the voltage monitoring line. If the output voltage is within an acceptable range, it is provided to the load (not shown) by activating the switch 48 via the switch enable line. The controller 32 can then continuously monitor the output voltage and the output current produced by the DC/DC converter 34 by measuring the output voltage via the voltage monitoring line and measuring the voltage drop across the sensing resistor (i.e., the voltage differential between the current monitoring line and the voltage monitoring line). If the controller 32 detects a fault condition of the DC/DC converter 34 (e.g., output voltage drops below a specific threshold), the controller 32 can disable and reset the DC/DC converter. The controller 32 communicates with the other DC/DC converters 36, 38, and 42 in the same manner.

A disadvantage with the control system of FIG. 2 is that it adds complexity and size to the overall electronic system by using a six-bit parallel bus to control each DC/DC converter and a separate three-line output connection to monitor the performance of each DC/DC converter. In other words, the controller 32 utilizes thirty-six separate connections in order to communicate with four DC/DC converters 34, 36, 38, and 42. As the complexity and power requirements of electronic systems increase, the number of connections to the controller will also increase in a linear manner.

Figure 3:
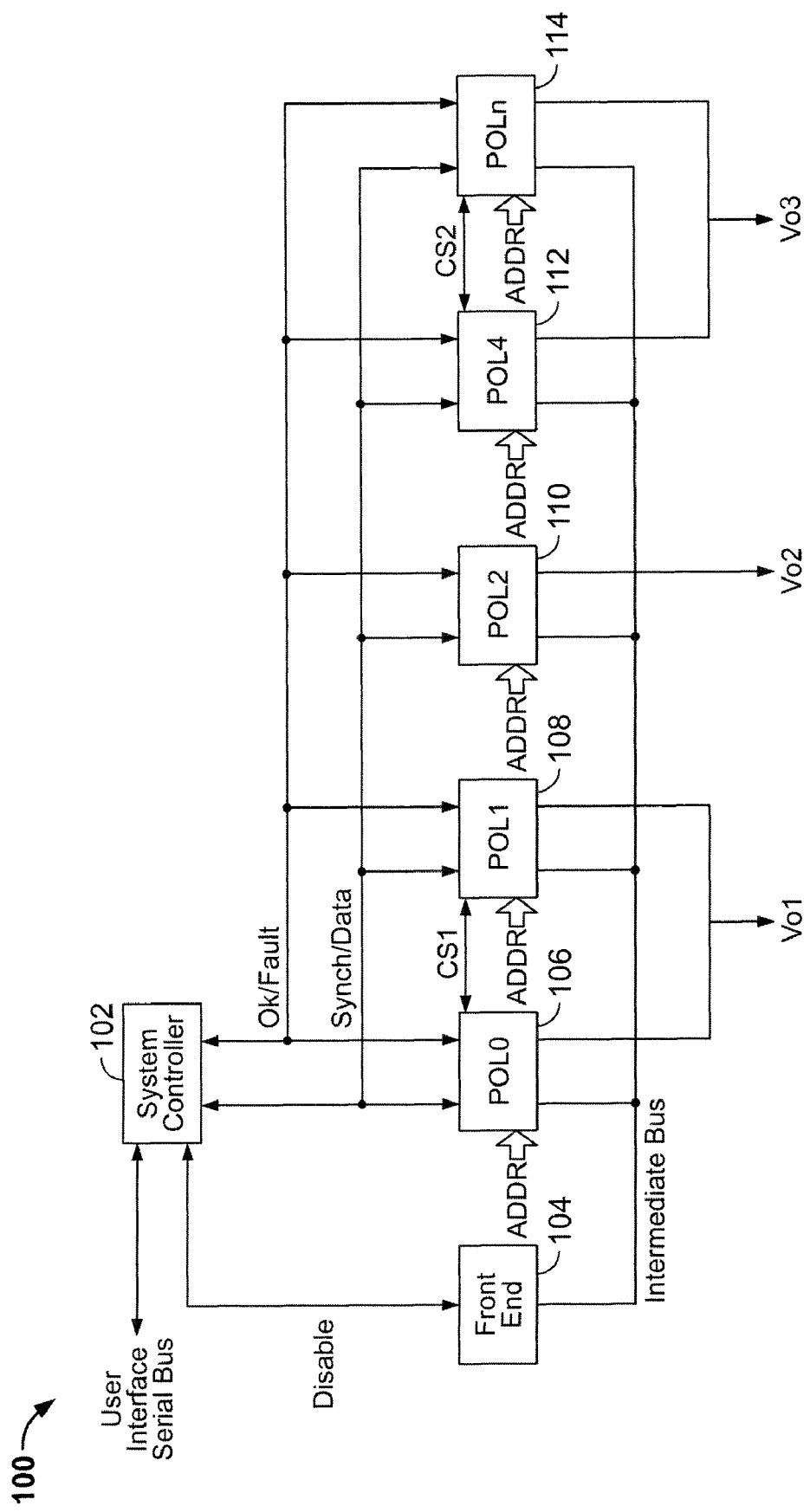
FIG. 3 depicts an exemplary POL control system constructed in accordance with an embodiment of the present invention.

Referring now to FIG. 3, a POL control system 100 is shown in accordance with an embodiment of the present invention. Specifically, the POL control system 100 includes a system controller 102, a front-end regulator 104, and a plurality of POL regulators 106, 108, 110, 112, and 114 arranged in an array. The POL regulators depicted herein include, but are not limited to, point-of-load regulators, power-on-load regulators, DC/DC converters, voltage regulators, and all other programmable voltage or current regulating devices generally known to those skilled in the art. An intra-device interface is provided between individual ones of the POL regulators to control specific interactions, such as current share or paralleling, e.g., current share interface (CS1) provided between POL0 106 and POL1 108, and CS2 provided between POL4 112 and POLn 114. In the exemplary configuration shown in FIG. 3, POL0 106 and POL1 108 operate in parallel mode to produce output voltage $V_{O1}$ with increased current capability, POL2 110 produces output voltage $V_{O2}$, and POL4 112 and POLn 114 operate in parallel mode to produce output voltage $V_{O3}$, though it should be appreciated that other combinations and other numbers of POL regulators could be advantageously utilized.

The front-end regulator 104 provides an intermediate voltage to the plurality of POL regulators over an intermediate voltage bus, and may simply comprise another POL regulator. The system controller 102 and front-end regulator 104 may be integrated together in a single unit, or may be provided as separate devices. Alternatively, the front-end regulator 104 may provide a plurality of intermediate voltages to the POL regulators over a plurality of intermediate voltage buses. The system controller 102 may draw its power from the intermediate voltage bus.

The system controller 102 communicates with the plurality of POL regulators by writing and/or reading digital data (either synchronously or asynchronous) via a uni-directional or bidirectional serial bus, illustrated in FIG. 3 as the synch/data bus. The synch/data bus may comprise a two-wire serial bus (e.g., I²C) that allows data to be transmitted asynchronously or a single-wire serial bus that allows data to be transmitted synchronously (i.e., synchronized to a clock signal). In order to address any specific POL in the array, each POL is identified with a unique address, which may be hardwired into the POL or set by other methods. The system controller 102 also communicates with the plurality of POL regulators for fault management over a second unidirectional or bidirectional serial bus, illustrated in FIG. 3 as the OK/fault bus. By grouping plural POL regulators together by connecting them to a common OK/fault bus allows the POL regulators have the same behavior in the case of a fault condition. Also, the system controller 102 communicates with a user system via a user interface bus for programming, setting, and monitoring of the POL control system 10. Lastly, the system controller 102 communicates with the front-end regulator 104 over a separate line to disable operation of the front-end regulator.

Figure 4:
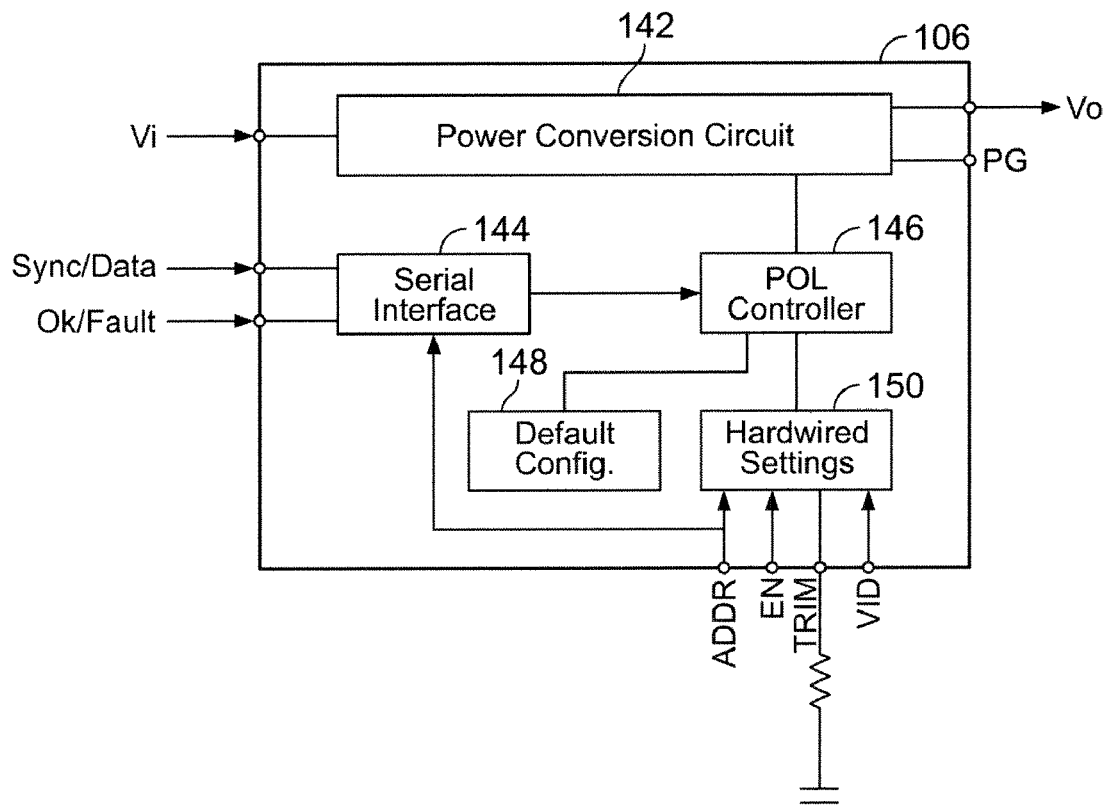
FIG. 4 depicts an exemplary POL regulator of the POL control system.

An exemplary POL regulator 106 of the POL control system 10 is illustrated in greater detail in FIG. 4. The other POL regulators of FIG. 3 have substantially identical configuration. The POL regulator 106 includes a power conversion circuit 142, a serial interface 144, a POL controller 146, default configuration memory 148, and hardwired settings interface 150. The power conversion circuit 142 transforms an input voltage ($V_i$) to the desired output voltage ($V_O$) according to settings received through the serial interface 144, the hardwired settings 150 or default settings. The power conversion circuit 142 may also include monitoring sensors for output voltage, current, temperature and other parameters that are used for local control and also communicated back to the system controller through the serial interface 144. The power conversion circuit 142 may also generate a Power Good (PG) output signal for stand-alone applications in order to provide a simplified monitoring function. The serial interface 144 receives and sends commands and messages to the system controller 102 via the synch/data and OK/fault serial buses. The default configuration memory 148 stores the default configuration for the POL regulator 106 in cases where no programming signals are received through the serial interface 144 or hardwired settings interface 150. The default configuration is selected such that the POL regulator 106 will operate in a "safe" condition in the absence of programming signals.

The hardwired settings interface 150 communicates with external connections to program the POL regulator without using the serial interface 144. The hardwired settings interface 150 may include as inputs the address setting (Addr) of the POL to alter or set some of the settings as a function of the address (i.e., the identifier of the POL), e.g., phase displacement, enable/disable bit (En), trim, and VID code bits. Further, the address identifies the POL regulator during communication operations through the serial interface 144. The trim input allows the connection of one or more external resistors to define an output voltage level for the POL regulator. Similarly, the VID code bits can be used to program the POL regulator for a desired output voltage/current level. The enable/disable bit allows the POL regulator to be turned on/off by toggling a digital high/low signal.

The POL controller 146 receives and prioritizes the settings of the POL regulator. If no settings information is received via either the hardwired settings interface 150 or the serial interface 144, the POL controller 146 accesses the parameters stored in the default configuration memory 148. Alternatively, if settings information is received via the hardwired settings interface 150, then the POL controller 146 will apply those parameters. Thus, the default settings apply to all of the parameters that cannot be or are not set through hard wiring. The settings received by the hardwired settings interface 150 can be overwritten by information received via the serial interface 144. The POL regulator can therefore operate in a stand-alone mode, a fully programmable mode, or a combination thereof. This programming flexibility enables a plurality of different power applications to be satisfied with a single generic POL regulator, thereby reducing the cost and simplifying the manufacture of POL regulators.

Figure 5:
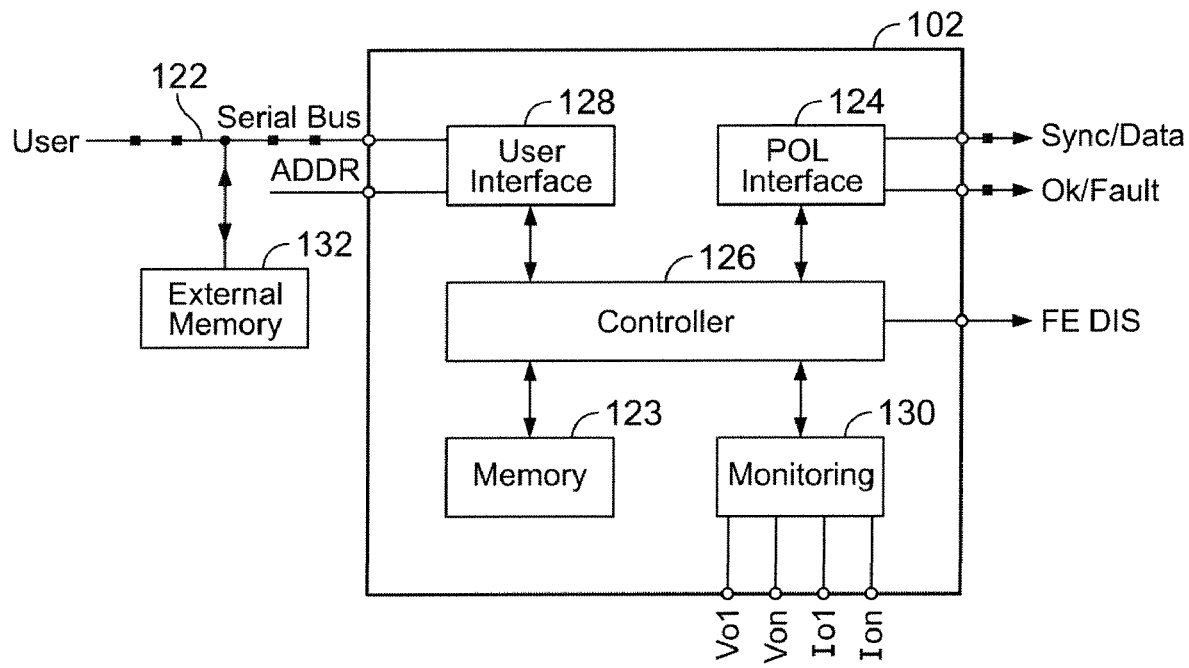
FIG. 5 depicts an exemplary system controller of the POL control system.

An exemplary system controller 102 of the POL control system 100 is illustrated in FIG. 5. The system controller 102 includes a user interface 122, a POL interface 124, a controller 126, and a memory 128. The user interface 122 sends and receives messages to/from the user (or host) via the user interface bus. The user interface bus may be provided by a serial or parallel bidirectional interface using standard interface protocols, e.g., an I²C interface. User information such as monitoring values or new system settings would be transmitted through the user interface 122. The communication with the user (or host) may be direct or via a local area network (LAN) or wide area network (WAN). A user may access the POL control systems for purposes of monitoring, controlling and/or programming the POL control systems by coupling directly to the user interface bus. The user system would likely include a user interface, such as a graphical user interface (GUI), that enables the display of status information regarding the POL control systems.

The POL interface 124 transforms data to/from the POL regulators via the synch/data and OK/fault serial buses. The POL interface 124 communicates over the synch/data serial bus to transmit setting data and receive monitoring data, and communicates over the OK/fault serial bus to receive interrupt signals indicating a fault condition in at least one of the connected POL regulators. The memory 128 comprises a non-volatile memory storage device used to store the system set-up parameters (e.g., output voltage, current limitation set-point, timing data, etc.) for the POL regulators connected to the system controller 102. Optionally, a secondary, external memory 132 may also be connected to the user interface 122 to provide increased memory capacity for monitoring data or setting data.

The controller 126 is operably connected to the user interface 122, the POL interface 124, and the memory 128. The controller 126 has an external port for communication a disable signal (FE DIS) to the front-end regulator 104. At startup of the POL control system 100, the controller 126 reads from the internal memory 128 (and/or the external memory 132) the system settings and programs the POL regulators accordingly via the POL interface 124. Each of the POL regulators is then set up and started in a prescribed manner based on the system programming. During normal operation, the controller 126 decodes and executes any command or message coming from the user or the POL regulators. The controller 126 monitors the performance of the POL regulators and reports this information back to the user through the user interface 122. The POL regulators may also be programmed by the user through the controller 126 to execute specific, autonomous reactions to faults, such as over current or over voltage conditions. Alternatively, the POL regulators may be programmed to only report fault conditions to the system controller 102, which will then determine the appropriate corrective action in accordance with predefined settings, e.g., shut down the front-end regulator via the FE DIS control line.

A monitoring block 130 may optionally be provided to monitor the state of one or more voltage or current levels of other power systems not operably connected to the controller 102 via the synch/data or OK/fault buses. The monitoring block 130 may provide this information to the controller 126 for reporting to the user through the user interface in the same manner as other information concerning the POL control system 100. This way, the POL control system 100 can provide some backward compatibility with power systems that are already present in an electronic system.

Returning to FIG. 3, the system controller 102 is adapted to provide initial-configuration data to each POL regulator (i.e., 106, 108, 110, 112, 114). It should be appreciated that the initial-configuration data may include, but is not limited to, one or more of the following types of data: output-voltage-set-point-data (i.e., a desired output voltage); output-current-set-point data (i.e., the highest desired output current); low-voltage-limit data (i.e., the lowest desired output voltage); high-voltage-limit data (i.e., the highest desired output voltage); output-voltage-slew-rate data (i.e., the desired output slew rate); enable/disable data (i.e., turning on/off the POL regulator output); timing data (e.g., turn-on delay, turn-off delay, fault recovery time, etc.) and/or all other types of POL programming data generally known to those skilled in the art. Once the initial-configuration data is received, the POL controller 146 (see FIG. 4) is adapted to store at least a portion of the initial-configuration data in memory. At least a portion of the stored initial-configuration data is then used to produce a desired output. For example, an output may be produced to include a particular voltage level, a particular slew rate, etc., depending on the type of initial-configuration data received/stored.

After the output has been produced, the POL controller 146 is adapted to receive fault-monitoring data (e.g., from an external device, a sense circuit, etc.). The fault-monitoring data, which contains information on the POL regulator or its output, is then stored in the memory. The POL controller 146, in response to a condition (e.g., receiving a request, exceeding a known parameter, having a register's contents change, etc.), is then adapted to provide at least a portion of the fault-monitoring data to the system controller 102. It should be appreciated that the fault-monitoring data may include, but is not limited to, one or more of the following types of data: output-voltage data, which may include actual-output-voltage data (i.e., the measured output voltage) or voltage-comparison data (e.g., whether the measured output voltage is above or below the highest desired output voltage, whether the measured output voltage is above or below the lowest desired output voltage, etc.); output-current data, which may include actual-output-current data (i.e., the measured output current) or current-comparison data (e.g., whether the measured output current is above or below the highest desired output current); temperature-status data, which may include actual-temperature data (i.e., the measured temperature of a POL regulator, or more particularly its heat generating components) or temperature-comparison data (e.g., whether the temperature of the POL regulator (or its components) is above or below a known value, etc.), and/or all other types of POL fault monitoring data generally known to those skilled in the art. It should also be appreciated that fault-monitoring data is not limited to data representing the existence of a faulty condition. For example, fault-monitoring data that indicates that the POL regulator is operating within acceptable parameters (e.g., within an acceptable temperature range) is considered to be within the spirit and scope of the present invention.

The fault-monitoring data can be used by either the system controller 102 or the POL controller 146 to monitor and/or control the POL regulator. In other words, the POL controller 146 can use the fault-monitoring data to either provide POL status information (i.e., data corresponding to a particular POL regulator or its output) to the system controller 102 or disable the POL regulator if a particular condition is met (e.g., the status register changes, the temperature limit has been exceeded, etc.). Alternatively, the system controller 102 can use the fault-monitoring data to either provide POL status information to an administrator, disable a particular POL regulator, or store the fault-monitoring data for future use. For example, in one embodiment of the present invention, each POL regulator includes unique ID data (e.g., serial number, date of manufacture, etc.) stored in an ID register. This enables the system controller 102 to provide POL status information and unique ID data to an administrator.

In another embodiment of the present invention, each POL regulator further includes at least one sensor circuit. The sensor circuit is used to produce either the fault-monitoring data, or data that can be used (e.g., together with information stored in the memory) to produce the fault-monitoring data. It should be appreciated that the sensor circuit, as described herein, will vary (e.g., as to circuitry, location, inputs, etc.) depending upon the type of information that is being detected. For example, a sensor circuit that detects current may include different circuitry, have different inputs, and be placed in a different location than a sensor circuit that detects temperature.

The POL control system 10 enables four different modes of operation. In the first operational mode, the POL regulators function independently in the absence of a system controller and without interaction with other POL regulators. The POL regulators each include local feedback and control systems to regulate their own performance as well as control interfaces to enable local programming. The POL regulators further include default settings in which they can revert to in the absence of local programming or data from the system controller. In other words, each of the POL regulators can operate as a standalone device without the need for a system controller or interactions with another POL regulator.

In the second operational mode, the POL regulators interoperate for the purpose of current sharing or interleaving in the absence of a system controller. The POL regulators communicate with each other over the current share interface. The synch/data line may be used to communicate synchronization information to permit phase interleaving of the POL regulators, in which the phase is programmed locally by entering an address through hardwired connections. In either the first or second modes of operation, there would generally be information communicated between the POL regulators except for synchronization; there would be no need to communicate programming information.

In the third operational mode, the POL regulators operate as an array in which the behavior of each POL regulator and the array as a whole are coordinated by a system controller. The system controller programs the operation of each of the POL regulators over the synch/data serial bus, and thereby overrides the predetermined settings of the POL regulators. The synch/data serial bus is further used to communicate synchronization information to permit synchronization and interleaving of the POL regulators. This operational mode would not include interdevice communications over the current share interface.

Lastly, the fourth operational mode includes both central control using the system controller and local control over certain functionality. This way, the POL regulators operate as an array coordinated by a system controller and also interoperate with each other to perform functions such as current sharing.

Figure 6:
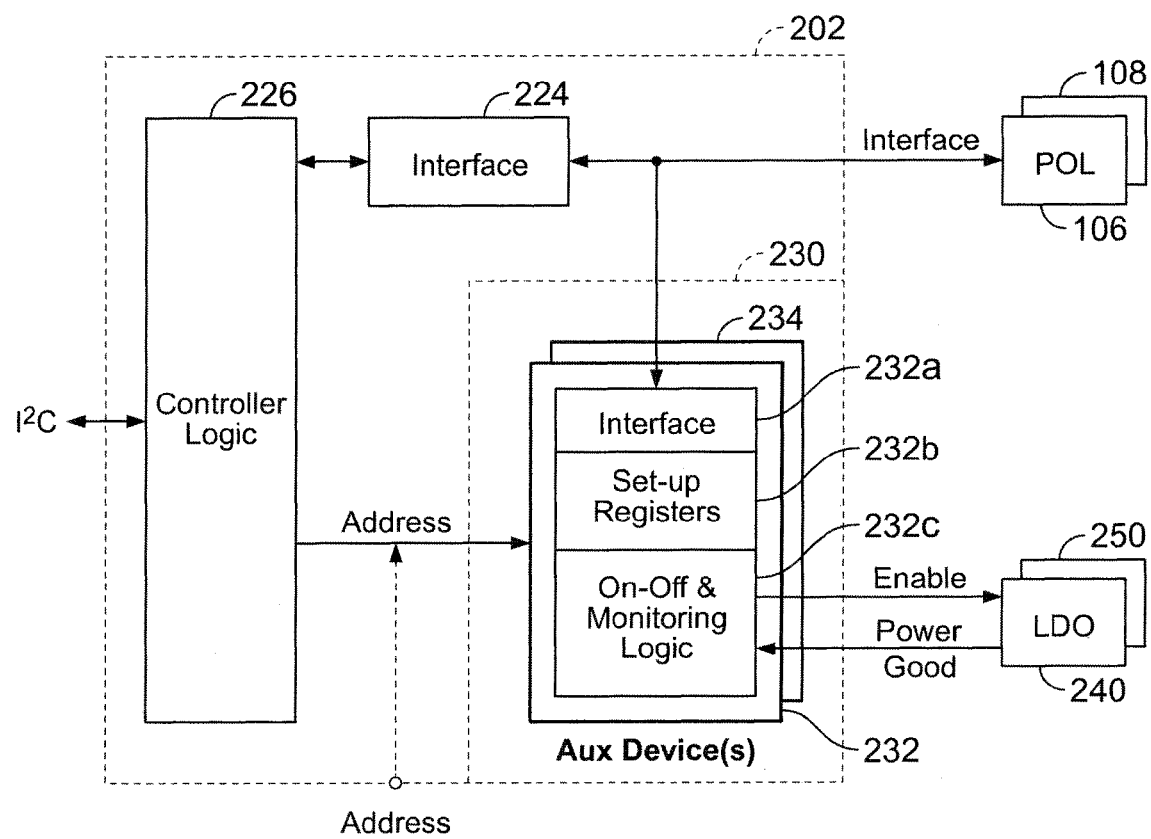
FIG. 6 depicts an alternative embodiment of a POL control system that provides control over auxiliary devices.

An alternative embodiment of the invention is illustrated in FIG. 6. In this embodiment, the POL control system may additionally include a plurality of auxiliary devices, such as exemplary LDOs 240, 250. The auxiliary devices would typically have less network capability and/or intelligence than the POL regulators, and may in some cases only be responsive to basic level (e.g., enable/disable) commands. The alternative POL control system includes a system controller 202, and a plurality of POL regulators 106, 108. The system controller 202 would monitor and control operation of the auxiliary devices in conjunction with the POL regulators to thereby provide a systems-level solution. The system controller 202 would be generally similar in construction to the system controller 102 discussed above with respect to FIG. 3. It should be appreciated that FIG. 6 illustrates differences from the embodiment of FIG. 3, while omitting other details for the sake of simplicity.

The alternative POL control system further includes an auxiliary device control system 230, which further includes plural auxiliary device controllers 232, 234. It should be appreciated that a separate auxiliary device controller may be associated with each individual auxiliary device under control. The auxiliary device control system 230 may be part of the system controller 202 (e.g., integrated into the same circuitry or semiconductor devices), or may be provided as a separate physical component of the POL control system.

The auxiliary device controllers 232, 234 further include a respective interface 232a, set-up registers 232b, and on-off and monitoring logic 232c. The interface 232a is adapted to communicate with the other elements of the POL control system via the synch/data bus. The system controller 202 includes an interface 224 that transforms data to/from the POL regulators via the synch/data and OK/fault serial buses. The interface 224 communicates over the synch/data serial bus to transmit setting data and receive monitoring data, and communicates over the OK/fault serial bus to receive interrupt signals indicating a fault condition in at least one of the connected POL regulators. The interface 232a is coupled to the synch/data bus to exchange the same types of data with the auxiliary devices. As discussed above, the synch/data bus may be a single wire or two-wire communication bus (e.g., $I^2C$) suitable to send and receive information between plural devices.

The set-up registers 232b define the operating parameters of the auxiliary devices. These registers 232b comprise a memory used to store the system set-up parameters (e.g., turn-on delay, turn-off delay, polarity of input/output signals (i.e., active low or high configuration), fault configuration, group membership, etc.) for the auxiliary devices. The data values loaded into the set-up registers 232b may be provided by the system controller through the synch/data bus.

The on-off and monitoring logic 232c provides a direct interface with the auxiliary devices. In particular, the logic 232c provides enable and disable commands to the auxiliary device in response to the values of the set-up registers 232b as well as commands received via the synch/data bus. For example, the on-off logic 232c will provide an enable command to the auxiliary device in accordance with timing data (e.g., turn-on delay) defined in the set-up registers 232b. The auxiliary devices will provide a responsive monitoring signal, such as a power good signal, reflecting the operating status of the auxiliary device. The monitoring logic 232c will then communicate this status information back to the system controller 226, such as via the synch/data bus. It should be appreciated that other types of commands to the auxiliary device and other types of status monitoring information from the auxiliary device could be utilized, depending upon the particular system needs and application for the auxiliary devices. Thus, the system controller 226 can control and monitor non-POL devices in the same manner in which it controls and monitor POL devices.

The auxiliary device controller 232 may be identified with a unique address. The address may be hardwired into the auxiliary device controller or set by other methods. The system controller 202 may use the address within data messages communicated to the auxiliary devices via the synch/data bus. Alternatively, the auxiliary device controller 232 may be addressed directly by the system controller 226 to alter or set some of the settings as a function of the address (i.e., the identifier of the auxiliary device). The auxiliary device controller 232 may also be addressed directly by a user or host, or hardwired, without having to go through the system controller 226.

Figure 7:
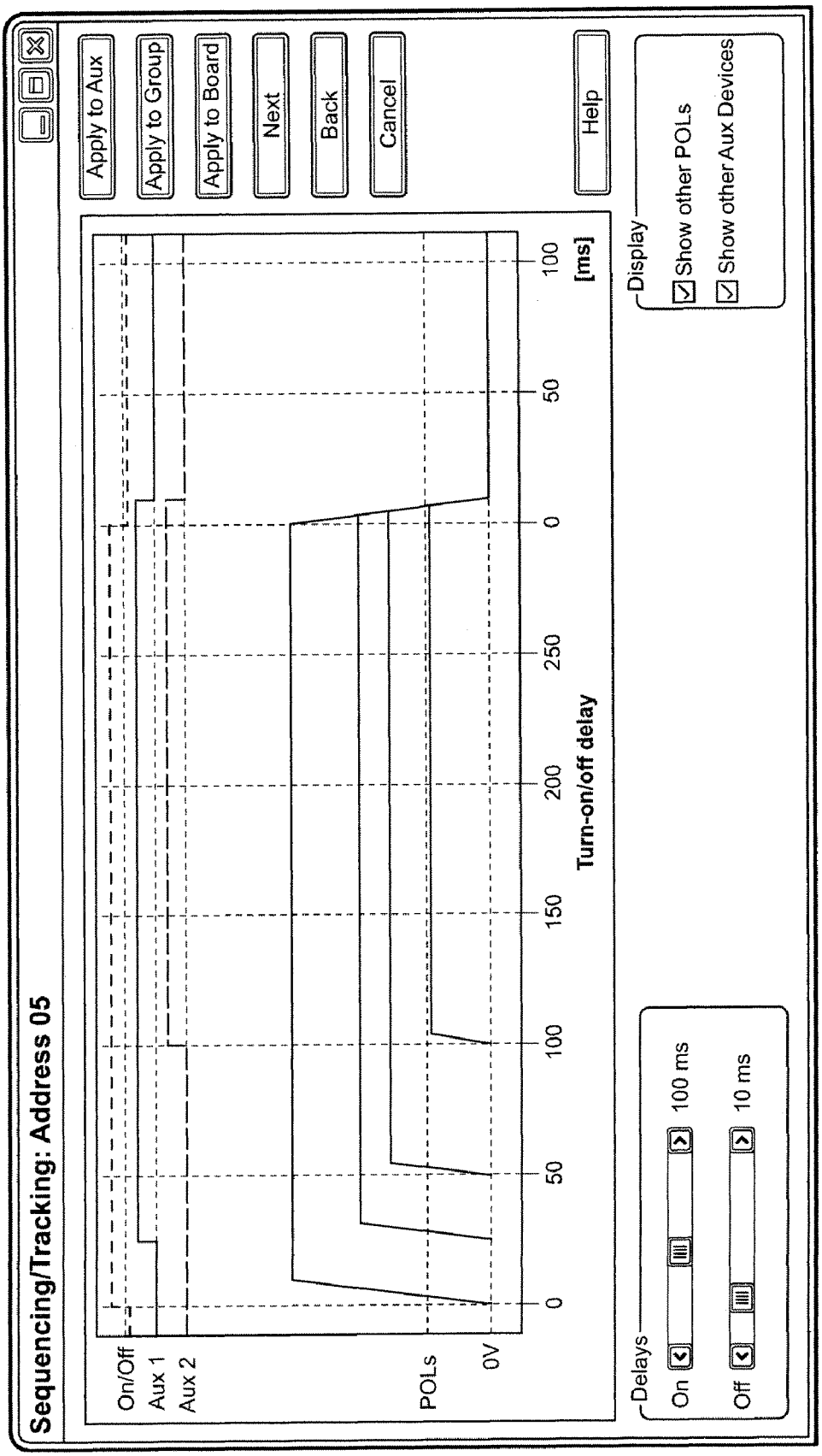
FIG. 7 depicts an exemplary graphical user interface (GUI) for controlling operation of auxiliary devices in accordance with the embodiment of FIG. 6.

FIG. 7 illustrates a screen shot of an exemplary graphical user interface (GUI) used to program the operation of auxiliary devices in accordance with the embodiment of FIG. 6. As discussed above, a user may access the POL control systems for purposes of monitoring, controlling and/or programming the POL control systems by coupling directly to the user interface bus via the system controller 226. The user system would likely include a GUI that enables the display of status information regarding the POL control systems. The GUI of FIG. 7 displays graphically the turn-on/off delay for the auxiliary devices as well as the POL regulators.

In particular, a timeline graph is included that shows an amount of time in milliseconds following a turn-on/off time (i.e., time 0). At the top of the graph, an on/off line shows a positive step function occurring at time 0 (i.e., turn-on time), and the time line resetting to time 0 with a negative step function (i.e., turn-off time). Activation waveforms for two exemplary auxiliary devices (i.e., Aux 1, Aux 2) show similar step functions that are offset from each time 0, reflecting a turn-on delay and a turn-off delay. Aux 1 shows a turn-on delay of approximately 25 milliseconds, and a turn-off delay of approximately 10 milliseconds. Similarly, Aux 2 shows a turn-on delay of approximately 100 milliseconds, and a turn-off delay of approximately 10 milliseconds. The graph also shows turn-on and turn-off delays for POL regulators. A slidable tool bar at the bottom left enables a user to adjust the magnitude of the turn-on and turn-off delays using a suitable pointing device. Buttons along the right side of the GUI enable the user to apply the programmed turn-on and turn-off delays to an individual auxiliary device, or to all auxiliary devices of a designated group, or to all auxiliary devices of the entire board. It should be appreciated that the GUI of FIG. 7 could be adapted to program other parameters of the auxiliary devices. Once the user has completed the programming, appropriate data values are loaded into the appropriate set-up registers within the corresponding auxiliary device controller, as discussed above.

It should be appreciated that a similar GUI may also be used to monitor performance of the auxiliary devices. A user may access the GUI via the user interface to the system controller, and view a graphic showing the operational status of the auxiliary devices as well as the POL regulators. In the event of a fault condition, for example, the user may be able to use the GUI to alter the operation of the POL control system by selectively turning off auxiliary devices and/or POL regulators, changing their sequencing or grouping, and taking other corrective measures.

A drawback with the embodiment of FIG. 6 is that the status information available from the auxiliary devices is necessarily limited. In the exemplary embodiment of FIG. 6, the auxiliary devices provide only a Power Good status signal. This Power Good status signal is "binary" in that it can reflect only two states: acceptable power state and unacceptable power state. It would be advantageous for certain applications if the system controller could receive more detailed monitoring information from the auxiliary device controller 232, similar to that received from the POL regulators 106, 108 (e.g., output voltage, output current, temperature, etc.)

Figure 8:
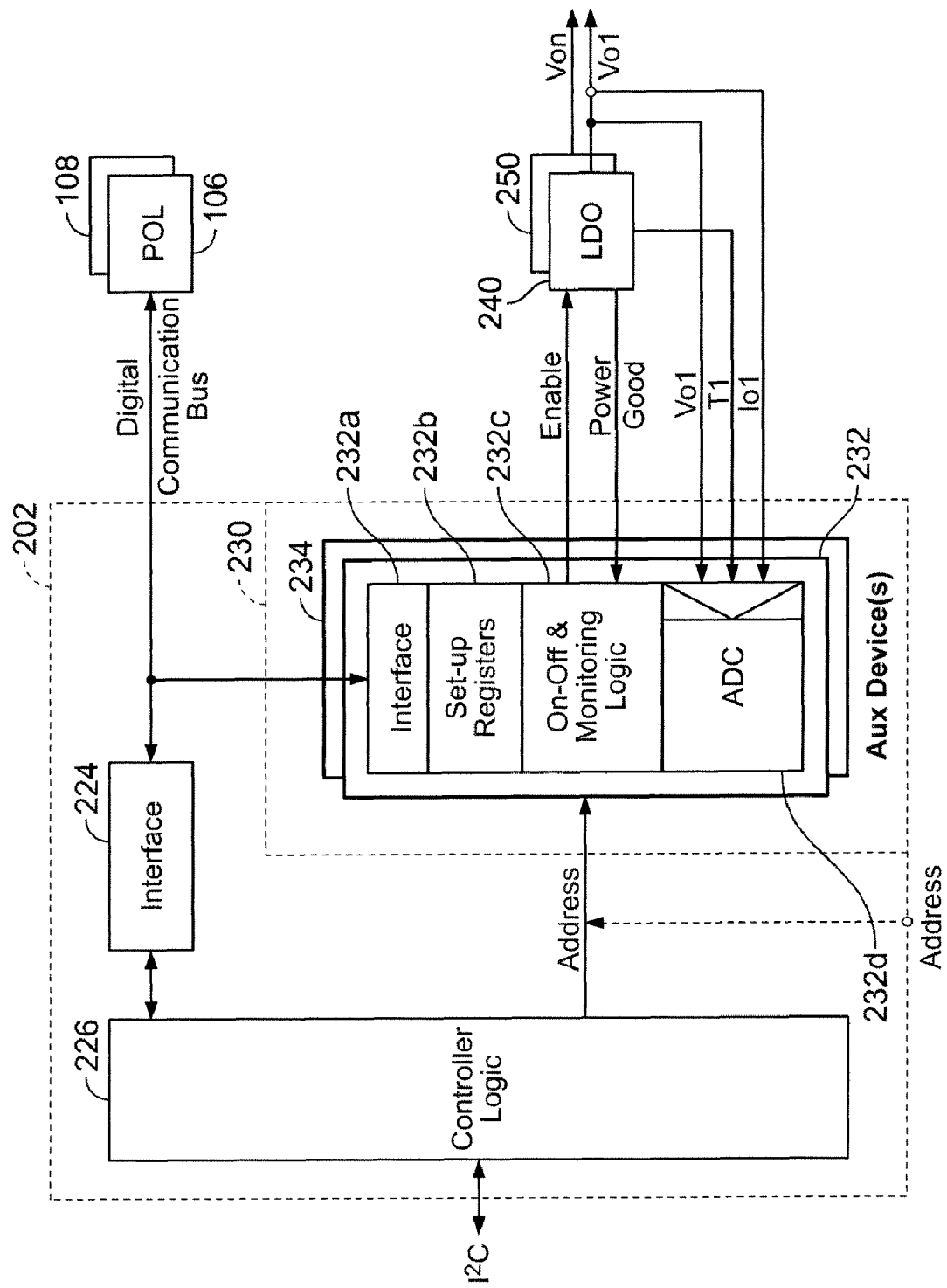
FIG. 8 depicts another alternative embodiment of a POL control system that provides monitoring and control over auxiliary devices.

An alternative embodiment of the invention is illustrated in FIG. 8. In this embodiment, the POL control system is substantially the same as in FIG. 6, with the addition of an analog-to-digital conversion circuit (ADC) 232d to the auxiliary device controllers 232, 234. The ADC 232d would receive various analog signal outputs from the plurality of auxiliary devices, such as output voltage ($V_{o1}$), output current ($I_{o1}$), and temperature ($T_1$). The ADC 232d would convert these analog outputs to a digital representation that is communicated the system controller logic 226 via interface 224.

Figure 9:
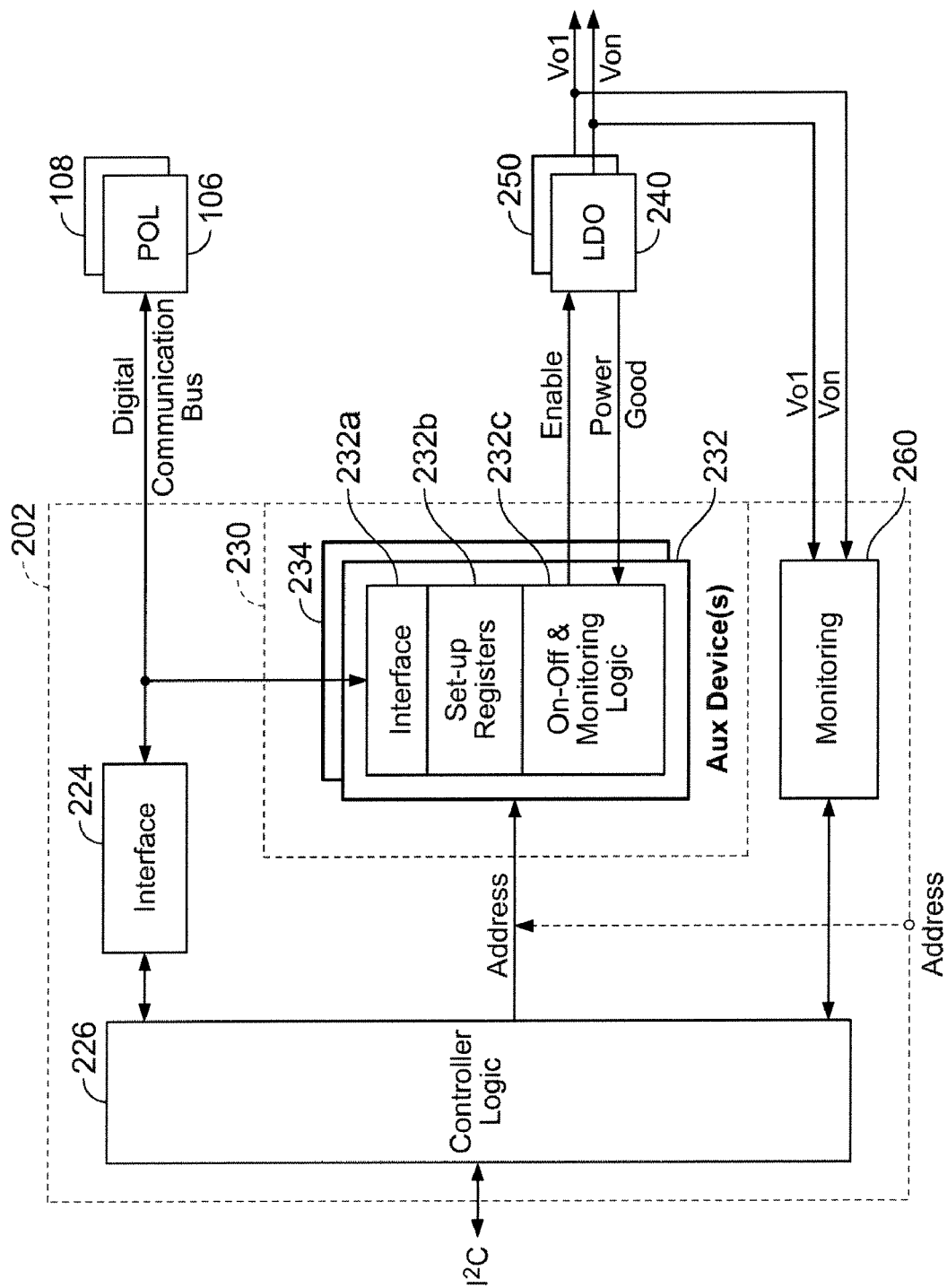
FIG. 9 depicts yet another alternative embodiment of a POL control system that provides monitoring and control over auxiliary devices.

In the alternative, instead of adding the ADC 232d to the auxiliary device controllers 232, 234, a separate monitoring circuit 260 may be included in the system controller 202 as shown in FIG. 9. The monitoring circuit 260 would operate similar to the monitoring block 130 discussed above with respect to FIG. 5. The monitoring circuit 260 would receive the analog signals from the auxiliary device(s), e.g., output voltage, output current, temperature, etc. Notably, the monitoring circuit 260 may not be operatively connected to the synch/data bus, and may communicate those monitoring data signals in analog or digital form directly to the controller logic 226.

Having thus described a preferred embodiment of a method and system to control and monitor an array of DC/DC power converters and auxiliary devices, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power control system comprising:
   at least one programmable voltage regulator adapted to provide a corresponding output voltage having characteristics defined by received programming data and to provide monitoring data reflecting operational status of the at least one programmable voltage regulator;
   at least one non-programmable auxiliary voltage regulator adapted to provide a corresponding output voltage in response to an enable signal;
   a system controller operatively connected to the at least one programmable voltage regulator and to said at least one auxiliary voltage regulator via a common serial data bus and adapted to send the programming data and receive the monitoring data via the serial data bus; and
   a data monitoring circuit operatively coupled to the at least one auxiliary voltage regulator to receive analog measurements therefrom and communicate corresponding monitoring data to the system controller.

2. The power control system of claim 1, wherein the data monitoring circuit further comprises an analog-to-digital converter (ADC) circuit adapted to convert the analog measurements to digital signals.

3. The power control system of claim 2, wherein the ADC circuit communicates the digital signals to the system controller via the common serial bus.

4. The power control system of claim 1, wherein the data monitoring circuit communicates the corresponding monitoring data to the system controller through a communication channel separate from the common serial bus.

5. The power control system of claim 1, further comprising a second serial data bus carrying fault management information between said system controller and said at least one programmable voltage regulator and said at least one auxiliary voltage regulator.

6. The power control system of claim 5, further comprising a front-end regulator providing an intermediate voltage to said at least one programmable voltage regulator on an intermediate voltage bus.

7. The power control system of claim 6, wherein said front-end regulator is combined with said system controller in a single device.

8. The power control system of claim 6, wherein said at least one programmable voltage regulator further comprises a power conversion circuit adapted to transform said intermediate voltage to a desired output voltage.

9. The power control system of claim 1, wherein said system controller further comprises a user interface adapted to communicate said programming data from a user to the at least one programmable voltage regulator.

10. The power control system of claim 9, further comprising a graphical user interface operatively coupled to the user interface, the graphical user interface adapted to enable user generation of said programming data.

11. The power control system of claim 1, wherein said at least one auxiliary voltage regulator each further comprises a unique address.

12. The power control system of claim 11, wherein the system controller includes the unique address with the programming data sent via the serial data bus.

13. The power control system of claim 1, wherein said at least one auxiliary voltage regulator further comprises a linear regulator.

14. The power control system of claim 1, wherein said at least one auxiliary voltage regulator further comprises a low drop-out (LDO) linear regulator.

15. The power control system of claim 1, wherein the programming data includes at least one of turn-on delay, turn-off delay, polarity of input/output signals, fault configuration, and group membership.

16. The power control system of claim 1, wherein the serial data bus further comprises an $I^2C$ bus.

17. The power control system of claim 1, wherein the serial data bus further comprises a two-wire bus.

18. The power control system of claim 1, wherein the serial data bus further comprises a single wire bus.

* * * * *

UNITED STATES PATENT AND TRADEMARK OFFICE
CERTIFICATE OF CORRECTION

| | | |
|---|---|---|
| PATENT NO. | : 7,836,322 B2 | Page 1 of 1 |
| APPLICATION NO. | : 11/930049 | |
| DATED | : November 16, 2010 | |
| INVENTOR(S) | : Alain Chapuis et al. | |

It is certified that error appears in the above-identified patent and that said Letters Patent is hereby corrected as shown below:

In Column 1, Lines 7-11 of the Letters Patent, the "Related Application Data" is hereby corrected to read:

This application claims priority as a continuation-in-part pursuant to 35 U.S.C. § 120 to patent application No. 11/760,660 filed on Jun. 8, 2007, which is continuation of patent application No. 11/354,550 filed on Feb. 14, 2006, now issued as Pat. No. 7,266,709 on Sep. 4, 2007, which is a continuation-in-part of patent application No. 10/326,222 filed on Dec. 21, 2002, now issued as Pat. No. 7,000,125 on Feb. 14, 2006.

Signed and Sealed this
Twenty-ninth Day of March, 2011

David J. Kappos
*Director of the United States Patent and Trademark Office*